(12) United States Patent
Adavalath Puthiyaveettil et al.

(10) Patent No.: US 12,479,577 B2
(45) Date of Patent: Nov. 25, 2025

(54) AUXILIARY CARGO RESTRAINT ASSEMBLY

(71) Applicant: GOODRICH CORPORATION, Charlotte, NC (US)

(72) Inventors: Sayooj Adavalath Puthiyaveettil, Bangalore (IN); Venkatesh Chitragar, Bangalore (IN); Mallikarjun Awarad, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 630 days.

(21) Appl. No.: 17/940,928

(22) Filed: Sep. 8, 2022

(65) Prior Publication Data

US 2023/0373628 A1 Nov. 23, 2023

(30) Foreign Application Priority Data

May 20, 2022 (IN) .............................. 202241029169

(51) Int. Cl.
*B64D 9/00* (2006.01)
(52) U.S. Cl.
CPC ........ B64D 9/003 (2013.01); *B64D 2009/006* (2013.01)
(58) Field of Classification Search
CPC ..... B64D 9/003; B64D 2009/006; B60P 7/06; B60P 7/13

USPC ............................ 410/77, 92, 104, 132, 139
See application file for complete search history.

(56) References Cited

U.S. PATENT DOCUMENTS

| | | | |
|---|---|---|---|
| 3,210,038 A * | 10/1965 | Bader | B63B 25/24 410/77 |
| 3,899,092 A * | 8/1975 | Nordstrom | B60P 1/52 414/535 |
| 4,379,668 A | 4/1983 | Pelletier | |
| 4,747,424 A * | 5/1988 | Chapman | B66F 11/048 137/868 |
| 6,729,818 B1 * | 5/2004 | Yee | B60P 7/0892 410/80 |
| 6,929,438 B1 * | 8/2005 | Foster | B60P 7/083 410/46 |
| 7,731,460 B2 * | 6/2010 | Brown | B60P 7/13 410/80 |

* cited by examiner

*Primary Examiner* — Amy R Weisberg

(74) *Attorney, Agent, or Firm* — SNELL & WILMER L.L.P.

(57) ABSTRACT

A cargo handling system is disclosed herein. The cargo handling system includes a ball panel for moving and storing cargo and a cargo restraining device disposed within the ball panel. The cargo restraining device includes a base, a cam head having a rounded base portion, the rounded base portion having a lock slot formed therein, a shaft securing the cam head to the base, and a spring-loaded lock plate configured to engage the lock slot.

18 Claims, 13 Drawing Sheets

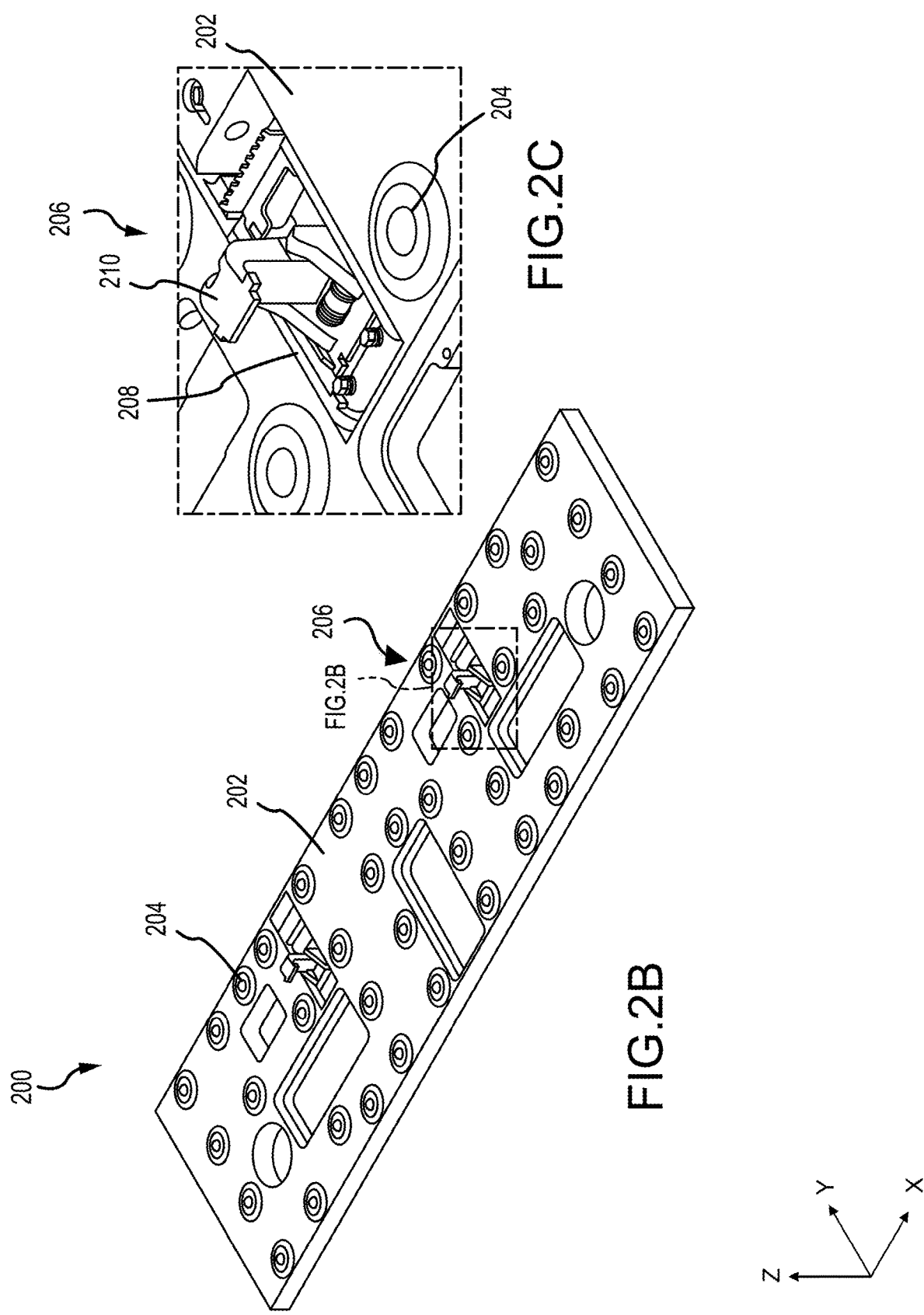

AUXILIARY CARGO RESTRAINT ASSEMBLY

CROSS-REFERENCE TO RELATED APPLICATIONS

This application claims priority to, and the benefit of, India Patent Application No. 202241029169, filed May 20, 2022 (DAS Code 44DF) and titled "AUXILIARY CARGO RESTRAINT ASSEMBLY," which is incorporated by reference herein in its entirety for all purposes.

FIELD

The present disclosure generally relates cargo restraining assemblies, and more specifically, to auxiliary cargo restraining assemblies.

BACKGROUND

Auxiliary restraint assemblies are used in air cargo compartments with the cargo surface, such as a ball panel, near the cargo loading door of an aircraft. Cargo loaded into the cargo compartment of an aircraft is secured to the aircraft using straps, webbing, or other mechanisms. The final pieces of cargo loaded into the cargo compartment are secured near the cargo loading door. Auxiliary restraint assemblies provide an additional level of cargo security near the cargo loading door.

SUMMARY

A cargo handling system is disclosed here. The cargo handling system includes a ball panel for moving and storing cargo and a cargo restraining device disposed within the ball panel. The cargo restraining device includes a base, a cam head having a rounded base portion, the rounded base portion having a lock slot formed therein, a shaft securing the cam head to the base, and a spring-loaded lock plate configured to engage the lock slot. In various embodiments, the cargo restraining device further includes a foot plate configured to disengage the spring-loaded lock plate from the lock slot.

In various embodiments, the cargo restraining device further includes a torsion spring coupled to the cam head and configured to return the cam head to a lowered position in response to the lock slot being disengaged. In various embodiments, the torsion spring is disposed around the shaft and within the rounded base portion of the cam head.

In various embodiments, the cargo restraining device further includes a torsion spring have a first end and a second end, the first end coupled to the base and the second end coupled to the spring-loaded lock plate. In various embodiments, the cam head further includes a first portion having a first end and an opposing second end, the first end coupled to the rounded base portion and a second portion extending orthogonally from the second end of the first portion. In various embodiments, the cam head further includes a protective lining disposed on a surface of the cam head including along the first portion and the second portion.

In various embodiments, the lock slot is formed in the rounded base portion at a first position, the cam head further including a stop slot formed in the rounded base portion at a second position, the second position being offset from the first position.

Also disclosed herein is a cargo restraining device including a base, a cam head having a rounded base portion, the rounded base portion having a lock slot formed therein, a shaft securing the cam head to the base, the cam head configured to rotate about the shaft, and a spring-loaded lock plate configured to engage the lock slot when the cam head is in a raised position. In various embodiments, the cargo restraining device further includes a torsion spring coupled to the cam head, the torsion spring biased to return the cam head to a lowered position within the base.

In various embodiments, the cargo restraining device further includes a stop slot formed into the rounded base portion of the cam head, the stop slot configured to engage the spring-loaded lock plate when the cam head is in a lowered position. In various embodiments, the spring-loaded lock plate further includes a foot plate and a side support extending between the foot plate and the spring-loaded lock plate. In various embodiments, the foot plate further includes a series of teeth along a top surface of the foot plate.

In various embodiments, the stop slot is offset about 70° to about 120° from the lock slot. In various embodiments, the cargo restraining device further includes a torsion spring having a first end and a second end, the first end being coupled to the base, and the second end being coupled to the spring-loaded lock plate. In various embodiments, the base includes a first sidewall, the first sidewall including a hole formed in the first sidewall, the hole configured to secure the torsion spring.

Also disclosed herein is a cargo restraining device. The cargo restraining device includes a frame having a first sidewall, an opposing second sidewall, and a first shaft having a first end and a second end, the first end coupled to the first sidewall, and the second end coupled to the second sidewall, a cam head assembly including a cam head and a second shaft, the second shaft coupling the cam head assembly to the frame, the cam head configured to rotate about the second shaft, and a spring-loaded lock plate coupled to the frame, the spring-loaded lock plate configured to stop a rotation of the cam head in a first position and a second position that is different than the first position.

In various embodiments, the cargo restraining device further includes a first slot disposed in a base portion of the cam head, the spring-loaded lock plate configured to engage the first slot to stop the rotation of the cam head at the first position and a second slot disposed in the base portion of the cam head, the spring-loaded lock plate configured to engage the second slot to stop the rotation of the cam head at the second position. In various embodiments, the spring-loaded lock plate is configured to engage the first slot to prevent rotation of the cam head. In various embodiments, the spring-loaded lock plate is configured to translate laterally to disengage the first slot, allowing rotation of the cam head.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A, 2B, and 2C illustrate a cargo handling system including a cargo restraining device, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
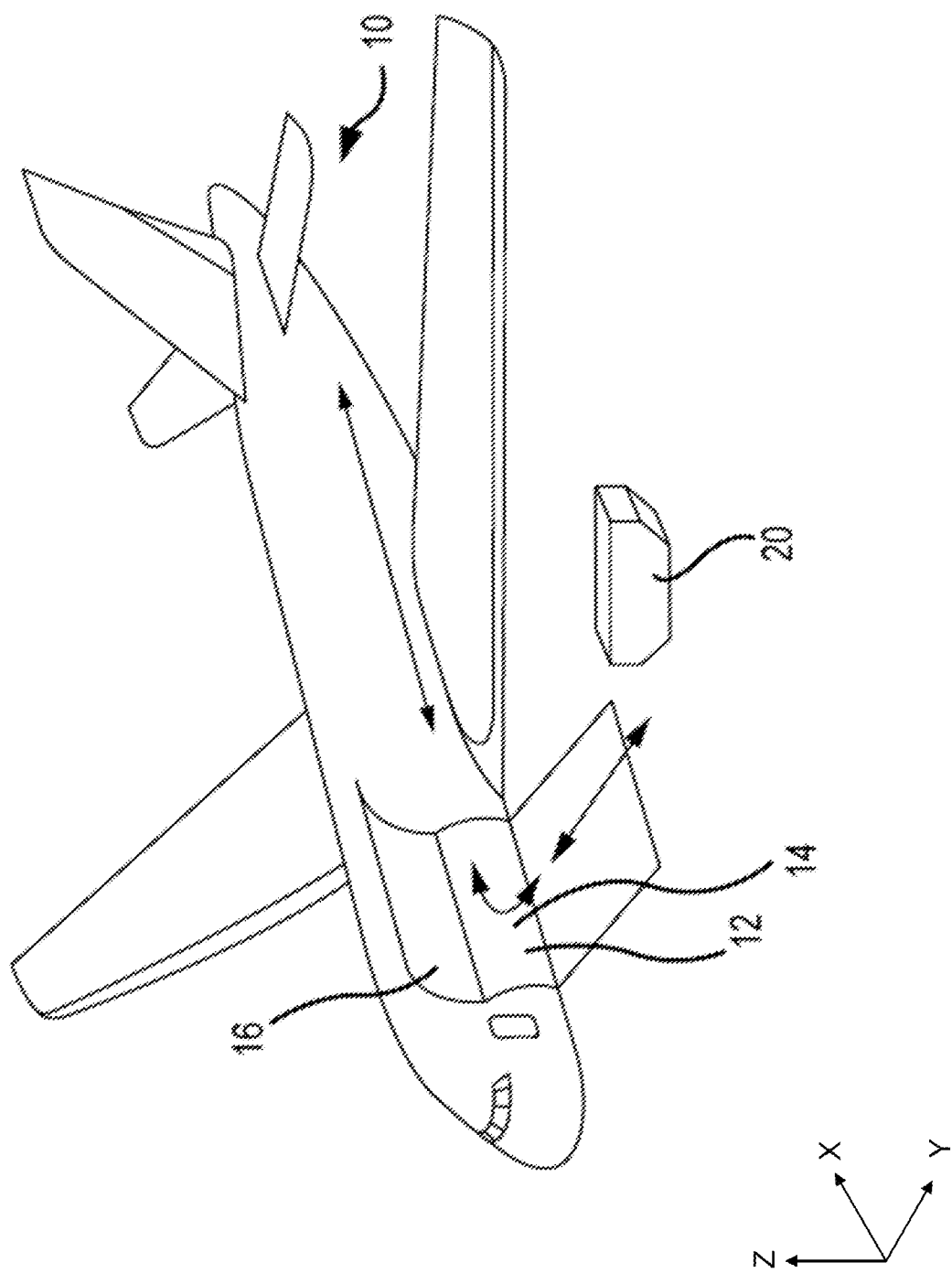
FIG. 1 illustrates a schematic of an aircraft being loaded with cargo, in accordance with various embodiments.

Referring to FIG. 1, in accordance with various embodiments, a perspective view of an aircraft 10 is illustrated. Aircraft 10 includes a cargo deck 12 located within a cargo compartment 14. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. A "ULD", as used herein, includes a container, pallet, or other cargo of any size, shape, configuration, and/or type. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift or the like. As illustrated, ULD 20 is loaded laterally (e.g., the negative y-direction) into cargo compartment 14. Once inside aircraft 10, ULD 20 may be moved longitudinally (e.g., the x-direction) cargo compartment 14 to a final stowed position. Straps may be used to secure ULD 20 in the final stowed position to minimize, or prevent, movement of ULD 20 during transport. Multiple ULDs may be brought on-board aircraft 10, with each ULD 20 being placed in a respective stowed position on cargo deck 12. One or more final ULDs 20 may be loaded laterally into cargo compartment 14 but not moved longitudinally within cargo compartment 14. After aircraft 10 has reached its destination, each ULD 20 is unloaded from aircraft 10 in similar fashion, but in reverse sequence to the loading procedure. To facilitate movement of ULD 20 along the cargo deck 12, aircraft 10 may include a cargo handling system as described herein in accordance with various embodiments.

Figure 2A:
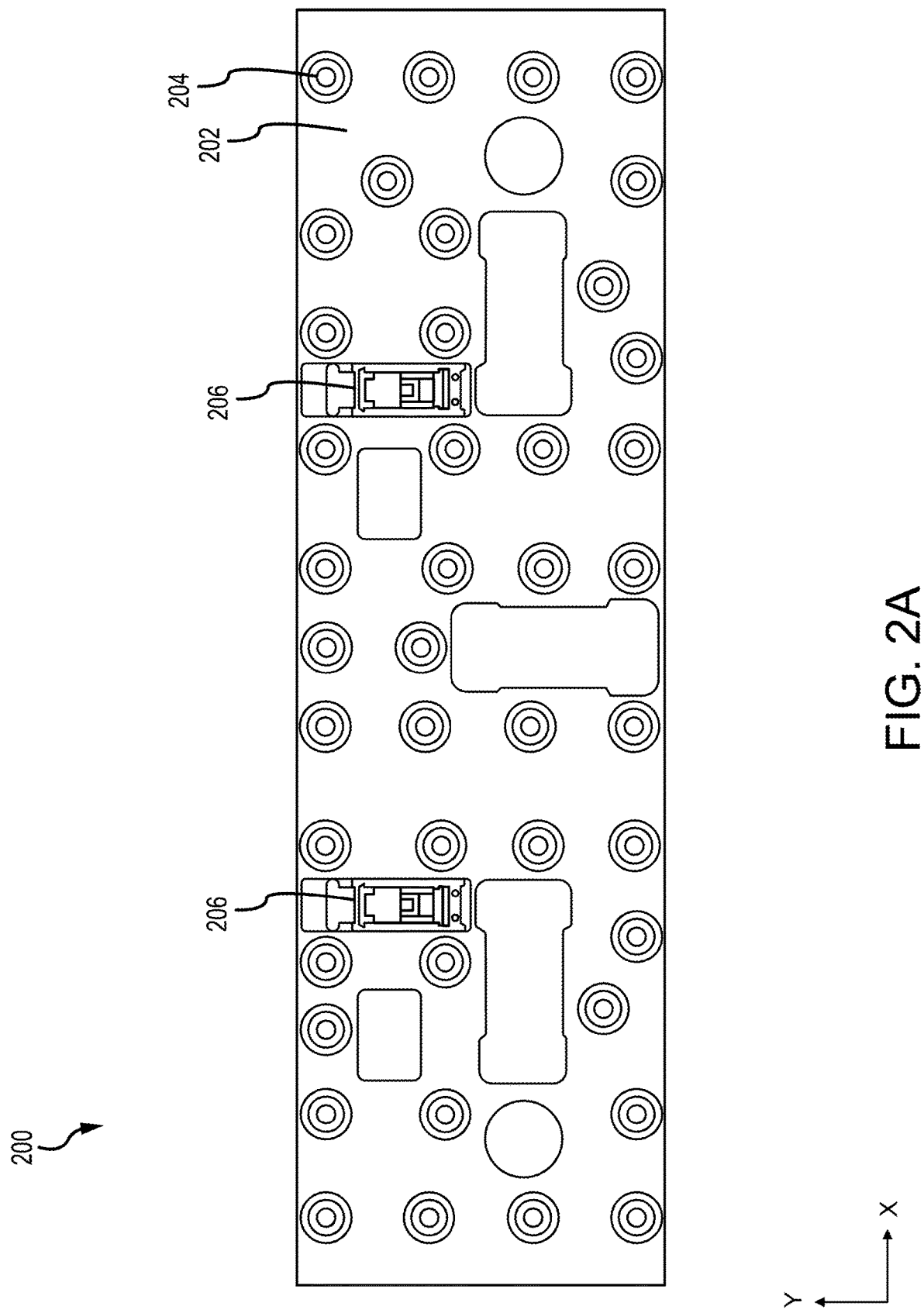

Referring now to FIGS. 2A-2C, in accordance with various embodiments, a cargo handling system 200 is illustrated. FIG. 2A is a top-down view of cargo handling system 200 and FIGS. 2B and 2C are perspective views of cargo handling system 200. Cargo handling system 200 includes a ball panel 202 having a plurality of omni-directional rollers 204 and one or more cargo restraining devices 206. Ball panel 202 may be located in cargo compartment 14, such as within the opening created by cargo load door 16. Ball panel 202 is configured to receive cargo (e.g., ULD 20) laterally within aircraft 10 (e.g., the negative y-direction) and move the cargo (e.g., ULD 20) longitudinally (e.g., the x-direction) within cargo compartment 14. Omni-directional roller 204 allow the cargo to move both laterally and longitudinally. In various embodiments, cargo handling system 200 may further include one or more power drive units (PDUs) configured to move the cargo along ball panel 202. For example, one or more PDUs may be configured to move the cargo laterally along ball panel 202 and one or more different PDUs may be configured to move the cargo longitudinally over ball panel 202.

Cargo restraining device 206 may include a base 208, also referred to as a frame, and a head cam assembly 210. Cargo restraining device 206 is configured to retract (i.e., fold head cam assembly 210 into base 208) and extend (i.e., deploy head cam assembly 210 from base 208). When in a retracted state, as illustrated in FIG. 2A, cargo restraining device 206 is below (i.e., in the negative z direction) the surface of ball panel 202, and more specifically, omni-directional roller 204 allowing cargo (e.g., ULD 20) to move across ball panel 202. In response to being extended, as illustrated in FIGS. 2B and 2C, cargo restraining device 206 is configured to restrain the cargo from moving in a specific direction (e.g., the y-direction). In various embodiments, cargo restraining device 206 is used as a backup restraining device to the straps that are used to restrain the cargo. In various embodiments, cargo restraining device 206 deployed near cargo load door 16 to prevent cargo (e.g., ULD 20) from moving toward cargo load door 16 in the event that the cargo shifts during transport.

Figure 3A:
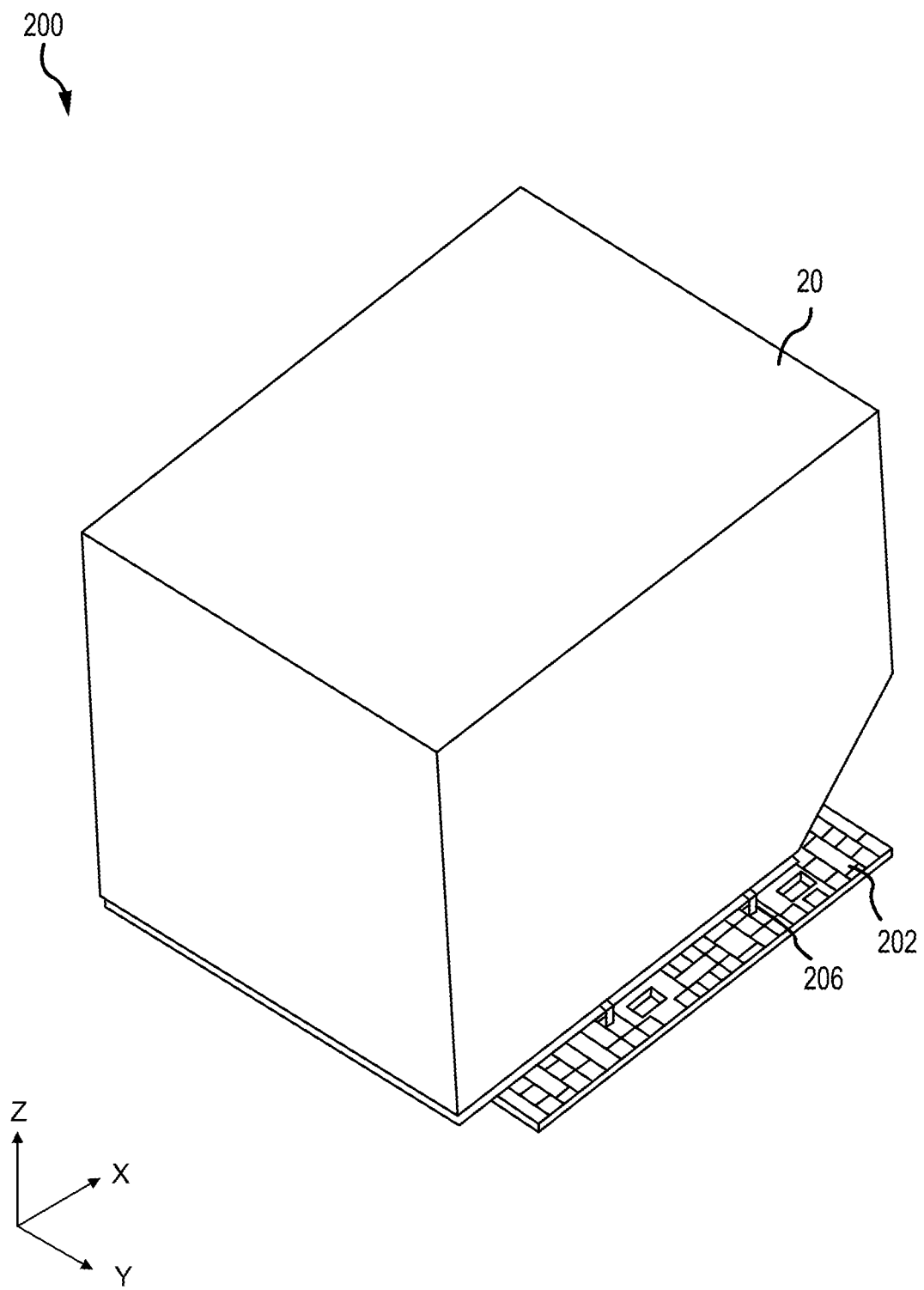
FIGS. 3A, 3B, and 3C illustrate a unit load device restrained by a cargo restraining device, in accordance with various embodiments.
Figure 3B:
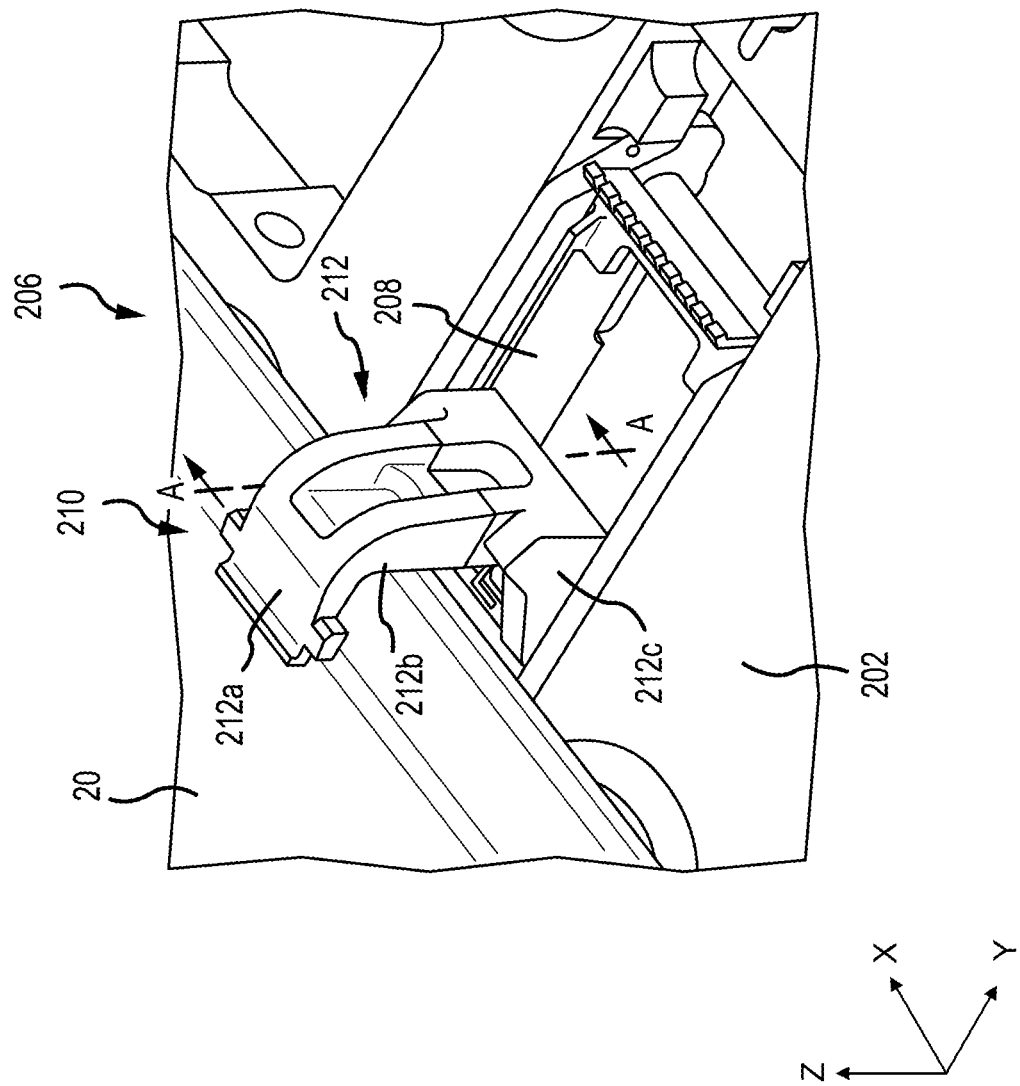
Figure 3C:
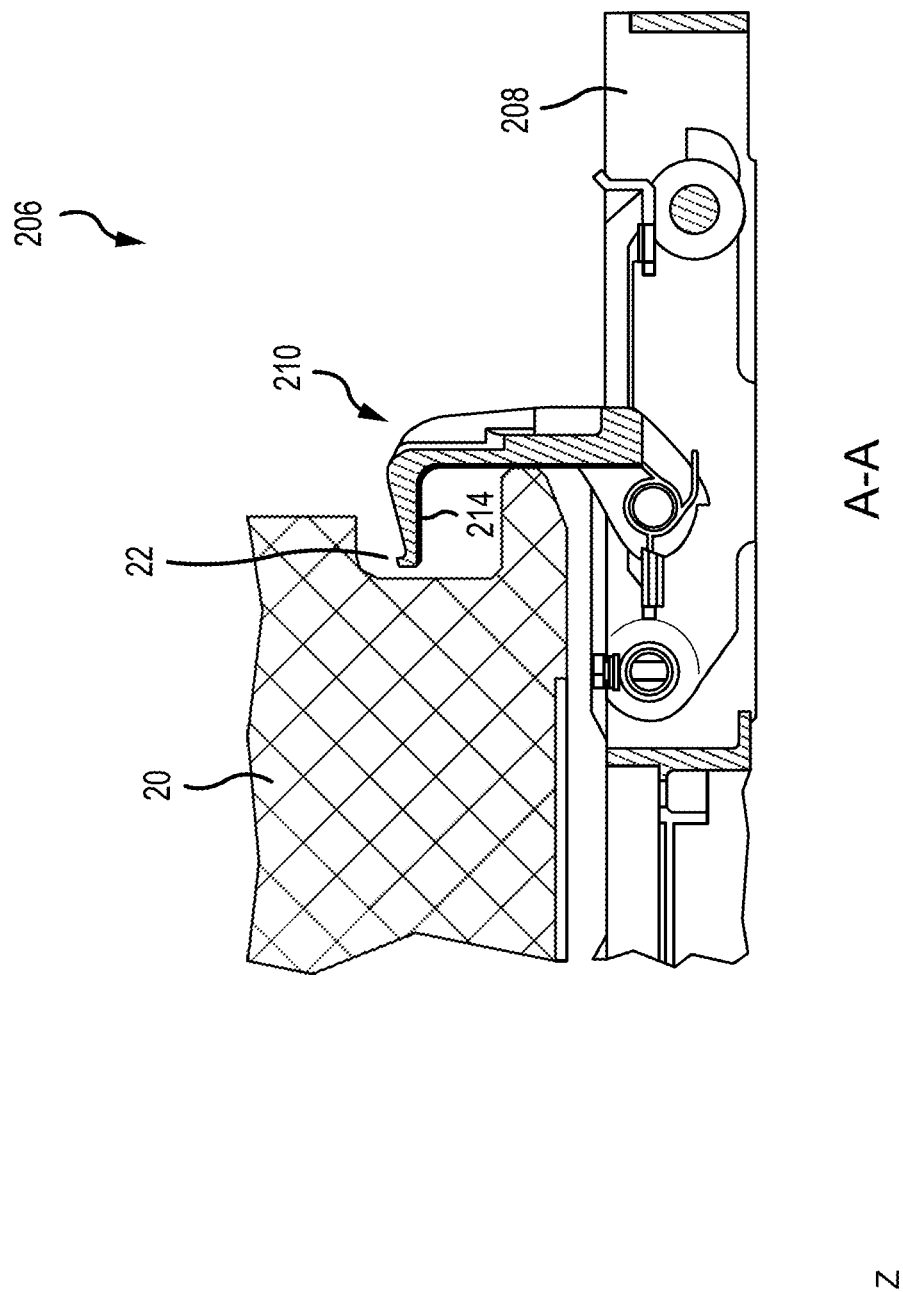

Referring now to FIGS. 3A-3C, in accordance with various embodiments, cargo handling system 200 with ULD 20 secured using cargo restraining device 206 is illustrated. FIG. 3A is a perspective view of cargo handling system 200 securing ULD 20 using cargo restraining device 206. FIG. 3B is a close-up perspective view of cargo restraining device 206 securing ULD 20. FIG. 3C is a close-up cross section view of cargo restraining device 206 securing ULD 20 along line A-A as shown in FIG. 3B. Cargo restraining device 206 secures ULD 20, preventing it from moving laterally along ball panel 202 (e.g., the y-direction). In various embodiments, more than one cargo restraining device 206 may be used to secure ULD 20 in one or more directions. For example, a second cargo restraining device 206 may be placed to prevent movement of ULD 20 in a direction opposite of the illustrated cargo restraining device 206 (e.g., the negative y-direction). As another example, an additional cargo restraining device 206 may be placed to prevent movement of ULD 20 longitudinally along ball panel 202 (e.g., the positive and/or negative x-direction).

In various embodiments, ULD 20 may include a feature, such as feature 22, configured to improve contact with cargo restraining device 206. Feature 22 may be a channel (as illustrated), a lip, or an indentation, among others. Head cam assembly 210 includes a cam head 212 having a top portion 212a, a vertical portion 212b, and a base portion 212c. Top portion 212a extends orthogonally from the vertical portion 212b creating an inverted L-shaped. Top portion 212a is configured to mate with the cargo (e.g., ULD 20) when a suitable feature (e.g., feature 22) is present. In cases where a suitable feature is not present, top portion 212a maintains contact with the cargo (e.g., a sidewall of cargo) to prevent the cargo from moving. Cam head 212 may include a protective lining, such as lining 214, to protect both cam head 212 and the cargo (e.g., ULD 20). In various embodiments, lining 214 lines the side of cam head 212 including top portion 212a and vertical portion 212b that come into contact with the cargo. Lining 214 may be silicone, PTFE, rubber, plastic, or metal, among others.

Figure 4A:
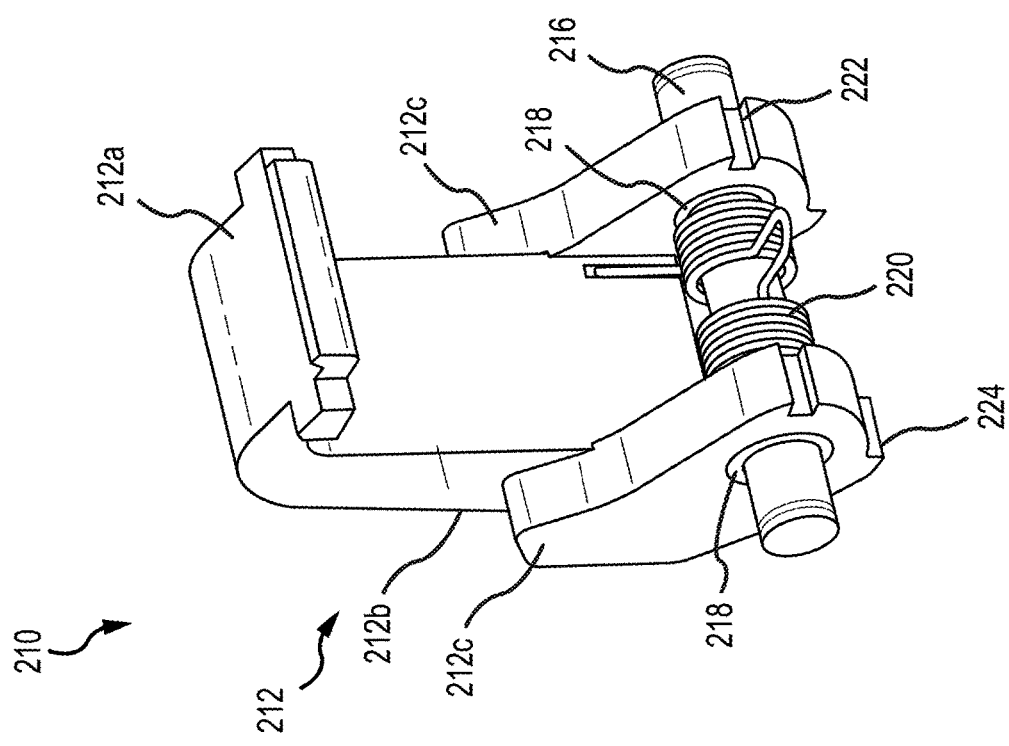
FIGS. 4A and 4B illustrate a cargo restraining device, in accordance with various embodiments.
Figure 4B:
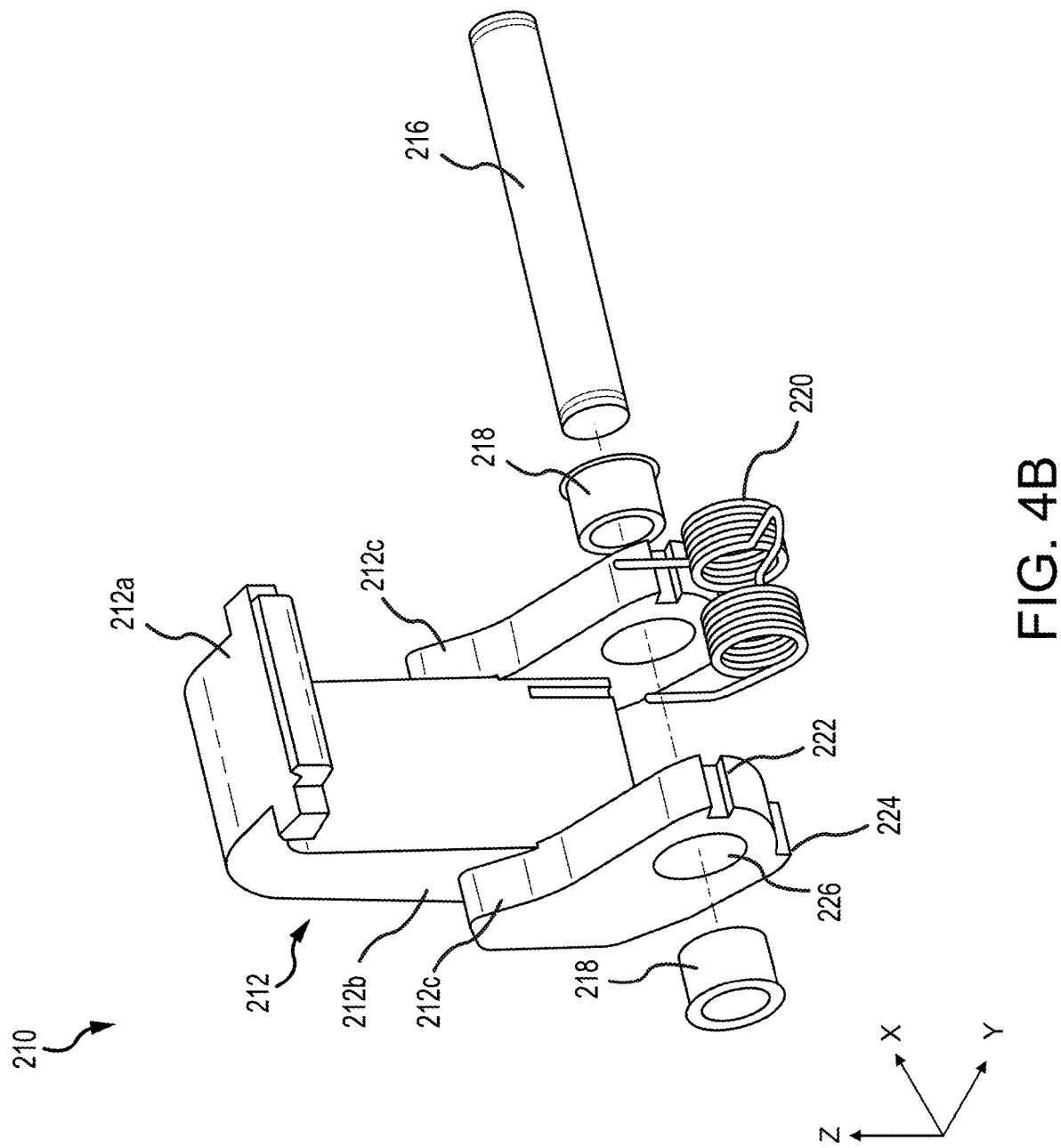

Referring to FIGS. 4A and 4B, in accordance with various embodiments, head cam assembly 210 of cargo restraining device 206 is illustrated. FIG. 4A is a perspective view of the various components of head cam assembly 210. FIG. 4B is an exploded perspective view of the various components of head cam assembly 210. Head cam assembly 210 includes cam head 212, a shaft 216, head bushings 218, and a torsion spring 220. As noted above, cam head 212 includes a top portion 212a, a vertical portion 212b, and a base portion 212c. Each side of base portion 212c is a cam that is rounded and includes a lock slot 222 and a stop slot 224. Lock slot 222 is configured to stop the rotation of cam head 212 and lock cam head 212 in the open, or upright, position, as will be discussed further below. Stop slot 224 is configured to stop the rotation of cam head 212 in response to returning to the closed, or lowered, position. In various embodiments, stop slot 224 is about 70° to about 120° offset from lock slot 222, and more specifically, about 80° to about 100° offset. The positioning of lock slot 222 and stop slot 224 define the range of rotation of cam head 212.

In various embodiments, cam head 212 is a unitary body. In various embodiments, base portion 212c is secured to vertical portion 212b by welding, bolts, or other means. Shaft 216 secures cam head 212 to base 208 allowing cam head 212 to rotate about shaft 216. Base portion 212c includes a hole 226 in each side that is configured to receive one of bushings 218. Shaft 216 slides through a first bushing 218 that is placed in a first hole 226 in base portion 212c. Shaft 216 then slides through torsion spring 220, a second bushing 218 placed in a second hole 226 in base portion 212c. Torsion spring 220 biases cam head 212 to return to the closed position, as will be explained in further detail below.

Figure 5A:
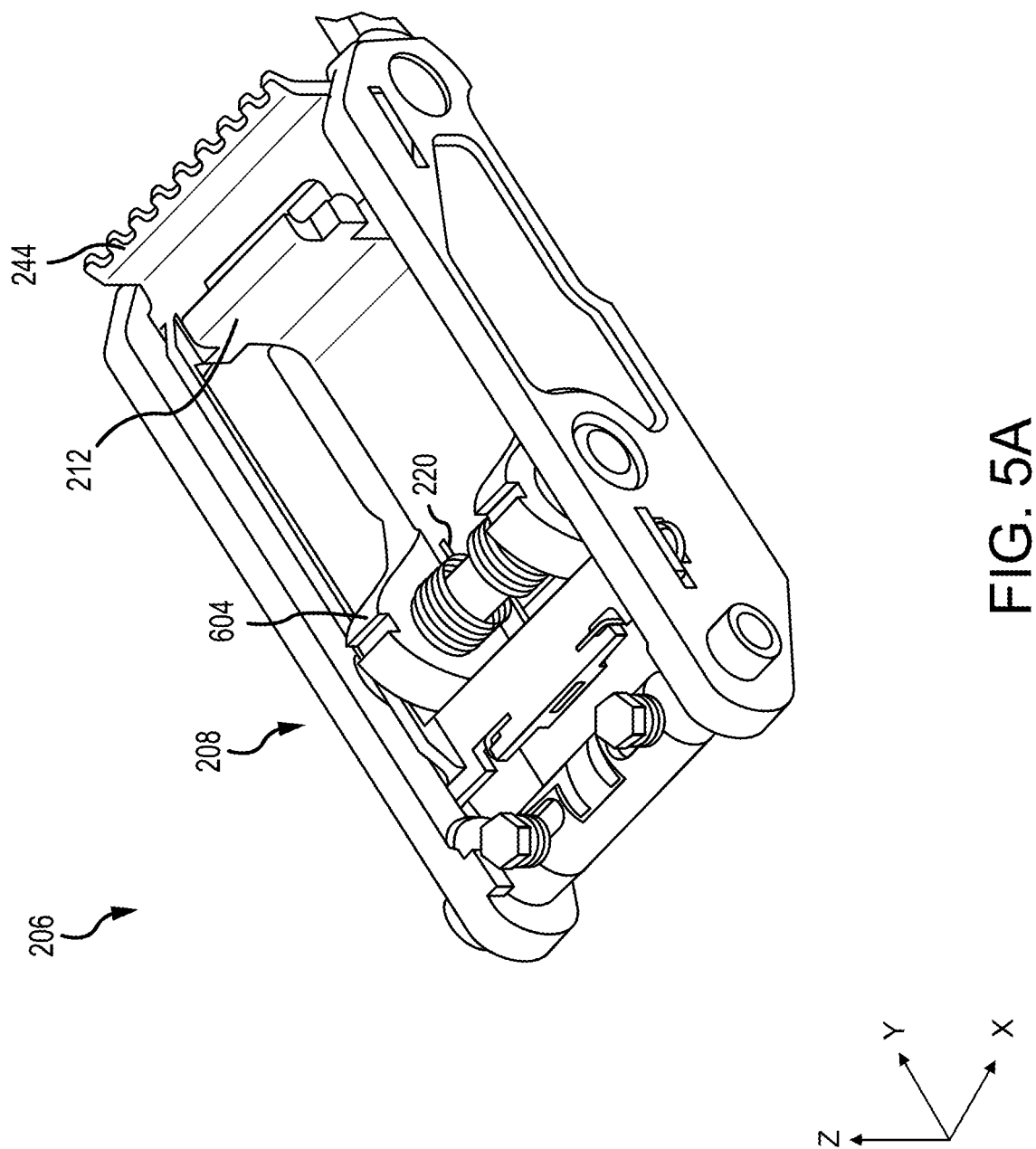
FIGS. 5A, 5B, and 5C illustrate a cargo restraining device, in accordance with various embodiments.
Figure 5B:
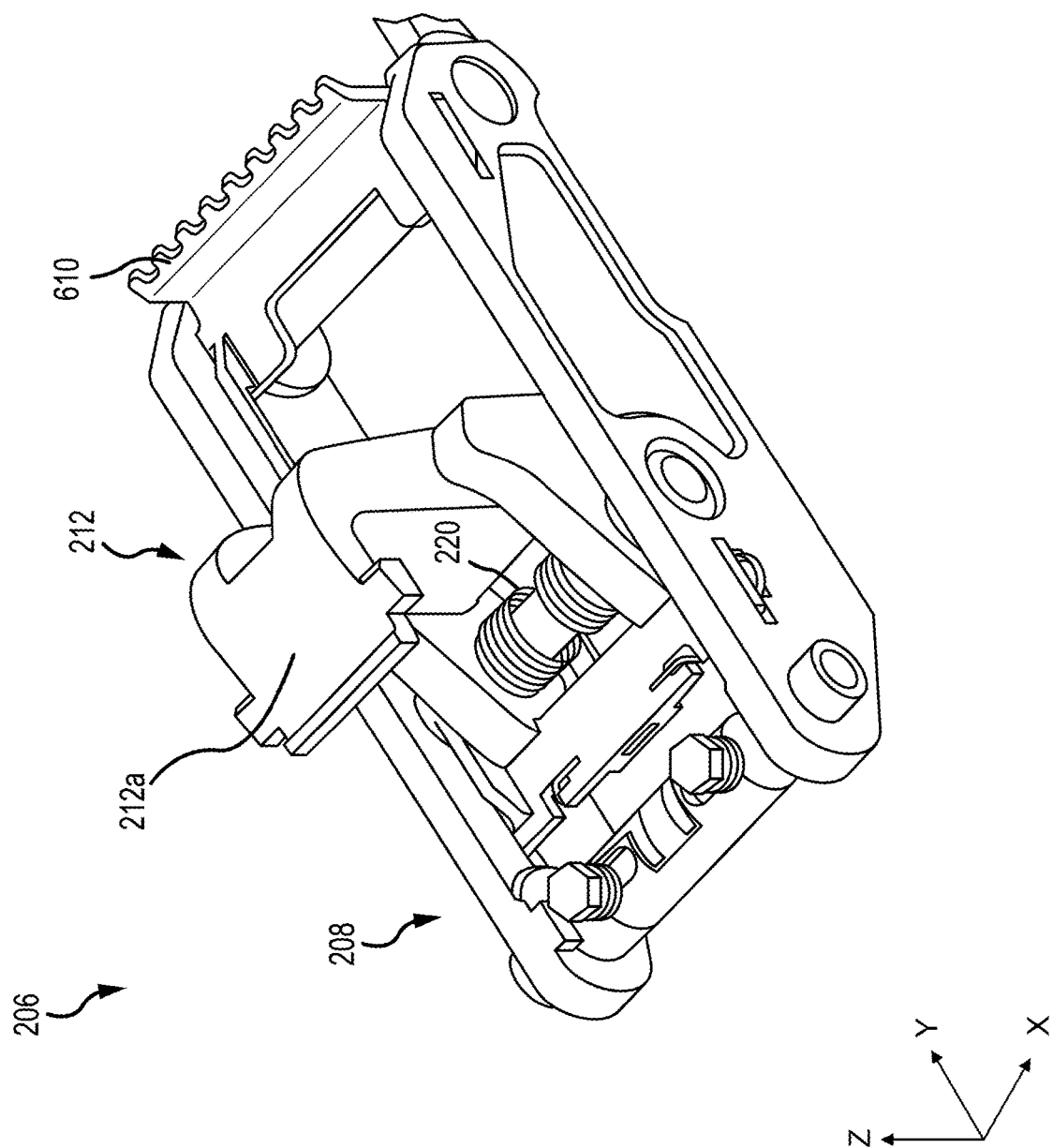
Figure 5C:
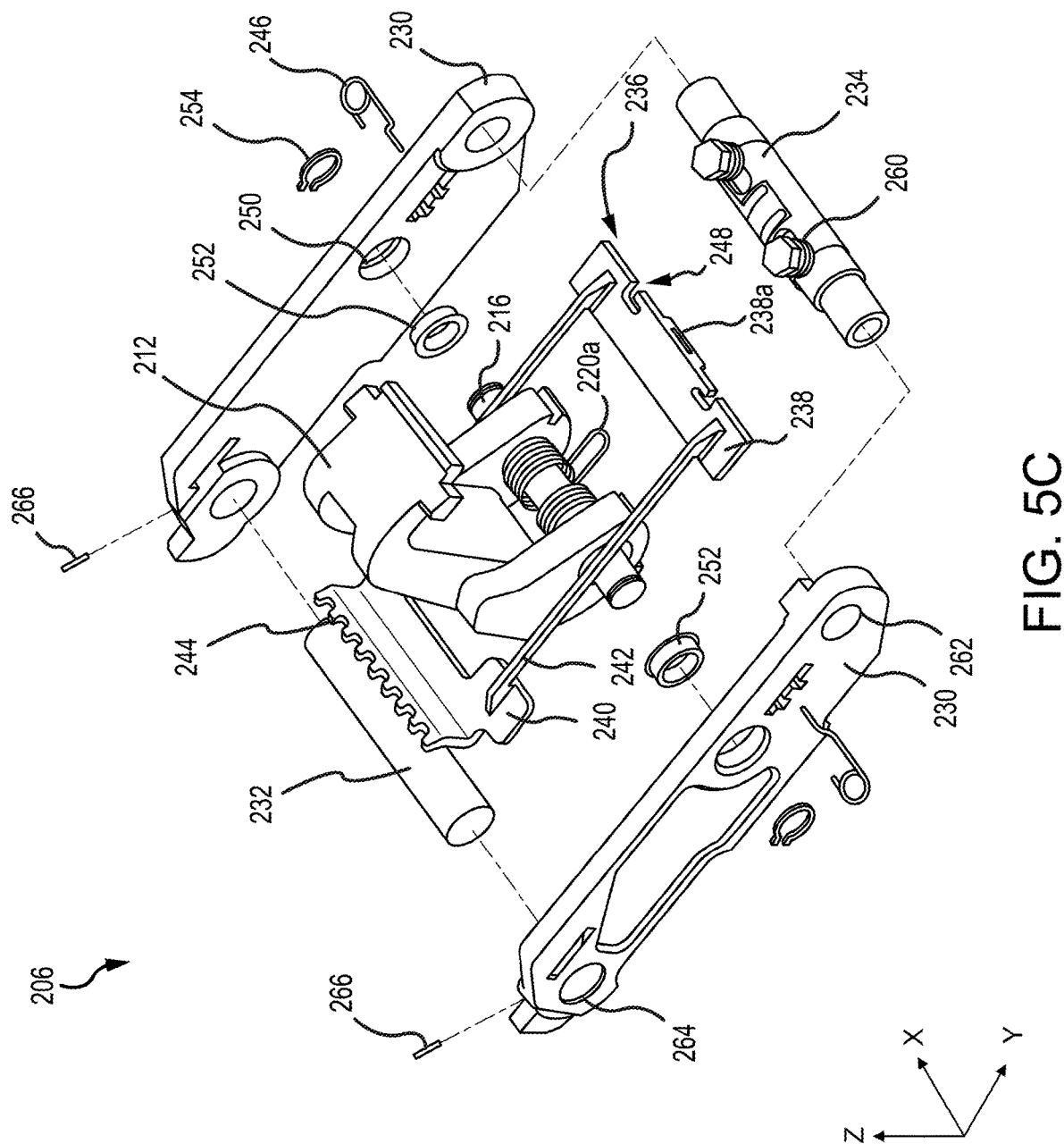

Referring to FIGS. 5A-5C, in accordance with various embodiments, cargo restraining device 206 is illustrated. FIG. 5A is a perspective view of cargo restraining device 206 in a folded, or retracted, position with cam head 212 folded down into base 208, also referred to as a frame. FIG. 5B is a perspective view of cargo restraining device 206 in an extended, or upright, position with cam head 212 extending orthogonally from base 208 (e.g., the z-direction). FIG. 5C is an exploded perspective view of cargo restraining device 206, illustrating the various components within cargo restraining device 206.

Base 208 of cargo restraining device 206 includes sidewalls 230, connector shaft 232, and retention pin shaft 234. Cargo restraining device 206 further includes a spring-loaded lock plate 236 that may be formed as a unitary body including a lock plate 238, a foot plate 240, and side supports 242. Foot plate 240 includes a number of teeth 244 (also referred to as ridges) to provide traction, or grip, for use by an operator. Spring loaded lock plate 236 is placed around cam head 212 and above shaft 216.

Spring-loaded lock plate 236 is movably secured to sidewalls 230 by a torsion spring 246 on each side. Torsion spring 246 slides through an opening in sidewall 230 and connects to lock plate 238. In various embodiments, lock plate 238 includes slots 248 configured to receive torsion springs 246. Torsion springs 246 bias lock plate 238 to press against cam head 212, and more specifically, against base portion 212c (e.g., the negative y-direction). Lock plate 238 contacts stop slots 224 when cam head 212 is in the lowered position. Lock plate 238 is configured to slide into lock slots 222 when cam head 212 is in the raised position, locking cam head 212 in the raised position and preventing further rotation of cam head 212. Torsion spring 220 includes a front extension 220a and lock plate 238 includes a through hole 238a that is configured to receive and secure front extension 220a. Through hole 238a may act as an anchor for torsion spring 220 allowing cam head 212 to rotate to the lowered position.

Base 208 further includes holes 250 in sidewalls 230 and bushings 252 configured to insert into holes 250. Each side of shaft 216 of cam head assembly 210 slides through a bushing 252 and a hole 250 on either side of base 208. A retaining ring 254 is configured to connect to an end of shaft 216 and prevent shaft 216 from sliding out of hole 250.

Retention pin shaft 234 is configured to secure each sidewall 230 to the other sidewall 230 of base 208. Each end of retention pin shaft 234 slides through a hole 262 in a sidewall 230. Retention pin shaft 234 may further include one or more tension bolts 260 to extend the ends of retention pin shaft 234 and lock retention pin shaft 234 in place. Similarly, each end of connector shaft 232 slides through a hole 264 in a sidewall 230. One or more pins 266 may then be used to secure connector shaft 232 to sidewalls 230.

Figure 6A:
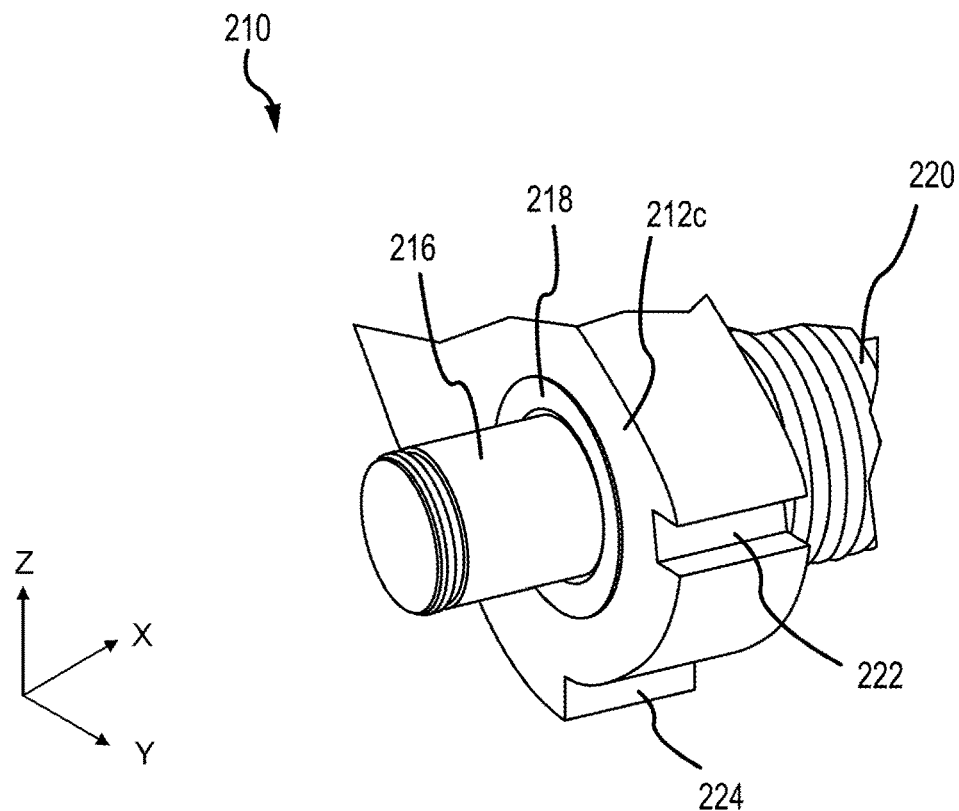
FIGS. 6A and 6B illustrate a cargo restraining device, in accordance with various embodiments.
Figure 6B:
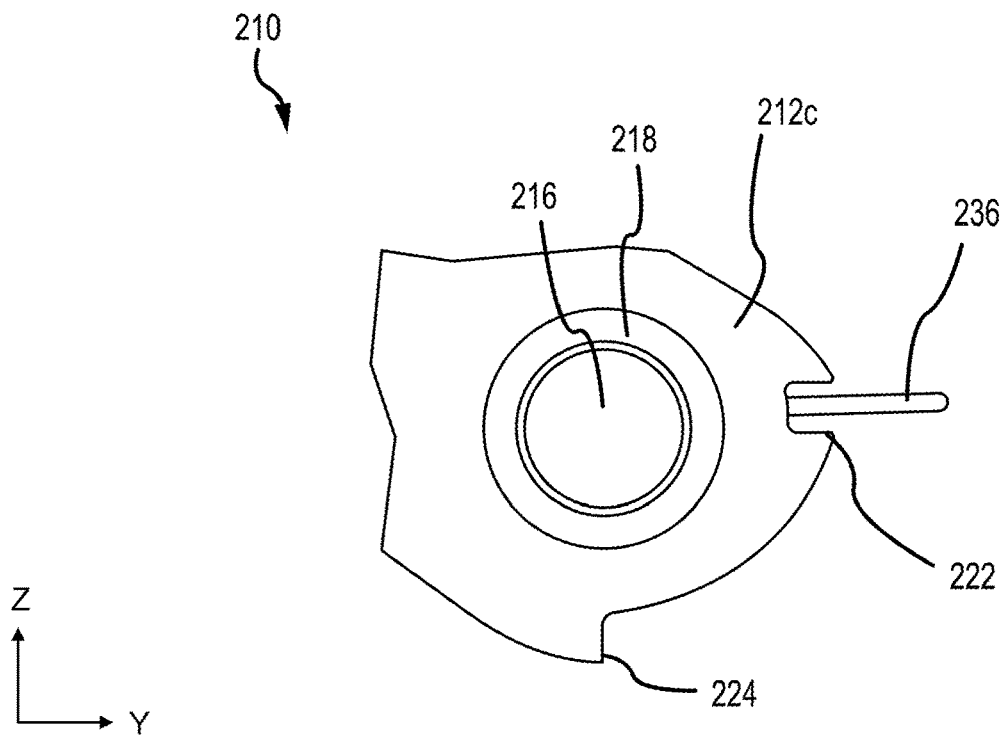

Referring to FIGS. 6A and 6B, in accordance with various embodiments, base portion 212c of cam head 212 is illustrated. FIG. 6A is a perspective view of base portion 212c of cam head 212. FIG. 6B is a side view of base portion 212c of cam head 212 in a locked position. As previously mentioned, base portion 212c includes lock slots 222 and stop slots 224. Lock slots 222 are configured to receive lock plate 238 when cam head 212 is in the raised position. Stop slots 224 are configured to contact lock plate 238 when cam head 212 is in the lowered position. As can be seen in FIG. 6B, lock plate 238 prevents cam head 212 from rotating in either direction.

Figure 7C:
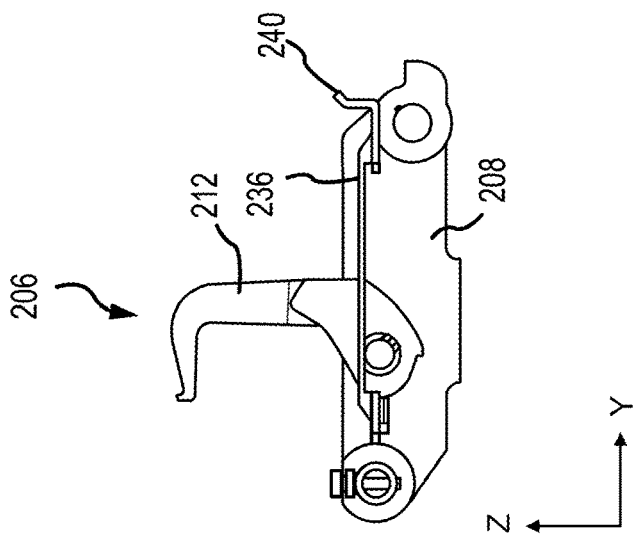
FIGS. 7A, 7B, and 7C illustrate the use of a cargo restraining device, in accordance with various embodiments.
Figure 7B:
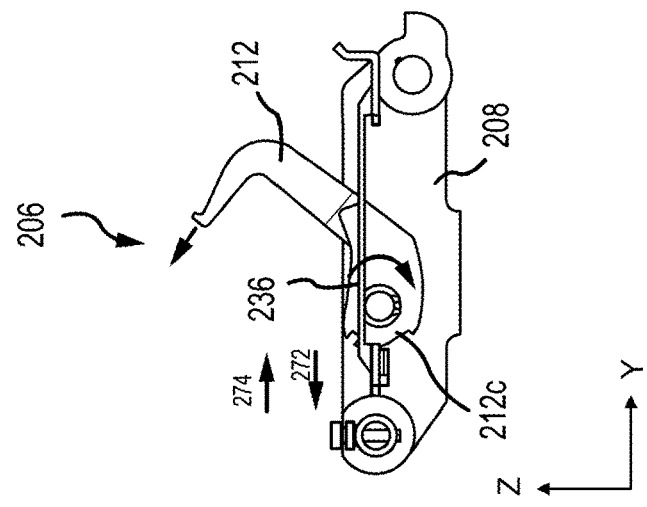
Figure 7A:
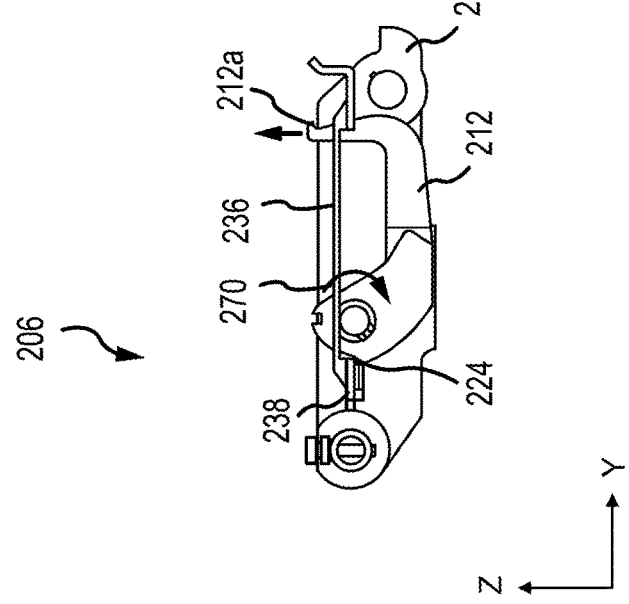

Referring to FIGS. 7A-7C, in accordance with various embodiments, the different positions of cargo restraining device 206 are illustrated. FIG. 7A is a side view of cargo restraining device 206 in a closed, or retracted, position. FIG. 7B is a side view of cargo restraining device transition from the closed position to an open position. FIG. 7C is a side view of cargo restraining device 206 in the open, or extended, position.

Cargo restraining device 206 is stored in the closed position as seen in FIG. 7A. Torsion spring 220 exerts a force on cam head 212 as shown by arrow 270. Stop slots 224 contact lock plate 238 preventing cam head 212 from rotating past horizontal (e.g., the x-plane). To engage cargo restraining device 206, an operator pulls up (e.g., the z-direction) on top portion 212a of cam head 212.

Cargo restraining device 206 rotates, as seen in FIG. 7B, from the closed position in response to the operator pulling on cam head 212. The shape of base portion 212c (e.g., the cams) exert a force as illustrated by arrow 272 on spring-loaded lock plate 236, pushing it away from cam head assembly 210 (e.g., the negative y-direction). Torsion springs 246 exert an opposite force as illustrated by arrow 274, keeping spring-loaded lock plate 236 in contact with base portion 212c while cam head 212 is raised.

Cargo restraining device 206 locks into the raised position, as seen in FIG. 7C, when spring-loaded lock plate 236, and more specifically, lock plate 238, slides into lock slots 222. Lock plate 238 prevents cam head 212 from rotating. Torsion spring 220 continues to apply a force to return cam head 212 to the lowered position. Torsion springs 246 continue to apply a force keeping lock plate 238 held in place in lock slots 222.

To return cargo restraining device 206 to the lowered position, the operator engages the foot plate 240. This may be done using a hand, a foot, or another object. Foot plate 240 is pressed so that lock plate 238 is forced out of lock slots 222 (e.g., the negative y-direction). The teeth 244, or ridges, of foot plate 240 provide grip, or traction, for ease of use by an operator. Torsion spring 220 returns cam head 212 to the lowered position when lock plate 238 is no longer secured in lock slots 222. This improves the safety and efficiency of releasing cargo restraining device 206. By engaging foot plate 240, the operator can release cargo restraining device 206 without bending over to manually retract cam head 212.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
   a ball panel for moving and storing cargo; and
   a cargo restraining device disposed within the ball panel, the cargo restraining device including:
   a base;
   a cam head having a rounded base portion, the rounded base portion having a lock slot formed therein;
   a shaft securing the cam head to the base, the rounded base portion of the cam head configured to rotate about the shaft; and
   a spring-loaded lock plate configured to engage the lock slot.

2. The cargo handling system of claim 1, the cargo restraining device further comprising:
a foot plate configured to disengage the spring-loaded lock plate from the lock slot.

3. The cargo handling system of claim 1, the cargo restraining device further comprising:
a torsion spring coupled to the cam head and configured to return the cam head to a lowered position in response to the lock slot being disengaged.

4. The cargo handling system of claim 3, wherein the torsion spring is disposed around the shaft and within the rounded base portion of the cam head.

5. The cargo handling system of claim 1, the cargo restraining device further comprising:
a torsion spring have a first end and a second end, the first end coupled to the base and the second end coupled to the spring-loaded lock plate.

6. The cargo handling system of claim 1, the cam head further comprising:
a first portion having a first end and an opposing second end, the first end coupled to the rounded base portion; and
a second portion extending orthogonally from the second end of the first portion.

7. The cargo handling system of claim 6, the cam head further comprising:
a protective lining disposed on a surface of the cam head including along the first portion and the second portion.

8. The cargo handling system of claim 1, wherein the lock slot is formed in the rounded base portion at a first position, the cam head further including a stop slot formed in the rounded base portion at a second position, the second position being offset from the first position.

9. A cargo restraining device, comprising:
a base;
a cam head having a rounded base portion, the rounded base portion having a lock slot formed therein;
a shaft securing the cam head to the base, the rounded base portion of the cam head configured to rotate about the shaft; and
a spring-loaded lock plate configured to engage the lock slot when the cam head is in a raised position.

10. The cargo restraining device of claim 9, further comprising:
a torsion spring coupled to the cam head, the torsion spring biased to return the cam head to a lowered position within the base.

11. The cargo restraining device of claim 9, further comprising:
a stop slot formed into the rounded base portion of the cam head, the stop slot configured to engage the spring-loaded lock plate when the cam head is in a lowered position.

12. The cargo restraining device of claim 11, the spring-loaded lock plate further comprising:
a foot plate; and
a side support extending between the foot plate and the spring-loaded lock plate.

13. The cargo restraining device of claim 12, the foot plate further comprising:
a series of teeth along a top surface of the foot plate.

14. The cargo restraining device of claim 11, wherein the stop slot is offset about 70° to about 120° from the lock slot.

15. The cargo restraining device of claim 9, further comprising:
a torsion spring having a first end and a second end, the first end being coupled to the base, and the second end being coupled to the spring-loaded lock plate.

16. The cargo restraining device of claim 15, wherein the base comprises a first sidewall, the first sidewall including a hole formed in the first sidewall, the hole configured to secure the torsion spring.

17. A cargo restraining device, comprising:
a frame having a first sidewall, an opposing second sidewall, and a first shaft having a first end and a second end, the first end coupled to the first sidewall, and the second end coupled to the second sidewall;
a cam head assembly including a cam head and a second shaft, the cam head having a rounded base portion, wherein the rounded base portion has a first slot and a second slot disposed in the rounded base portion of the cam head and the second shaft coupling the cam head assembly to the frame, the cam head configured to rotate about the second shaft; and
a spring-loaded lock plate coupled to the frame, the spring-loaded lock plate configured to engage the first slot and stop a rotation of the cam head in a first position and configured to engage the second slot and stop a rotation of the cam head in a second position that is different than the first position.

18. The cargo restraining device of claim 17, wherein the spring-loaded lock plate is configured to translate laterally to disengage the first slot, allowing rotation of the cam head.

* * * * *